*L. Holliday,*
*Miter Box,*
Nº 12,862. Patented May 15, 1855.
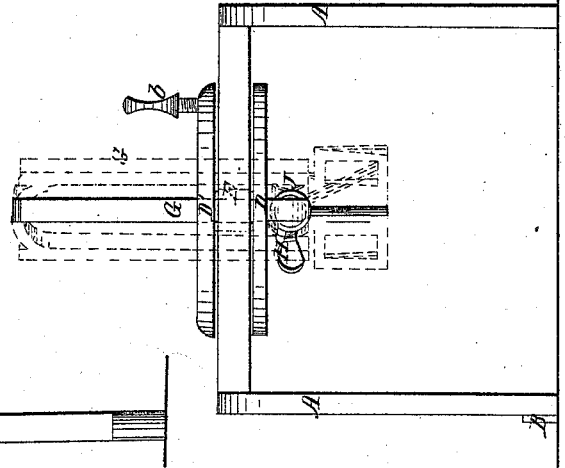
Fig. 2.
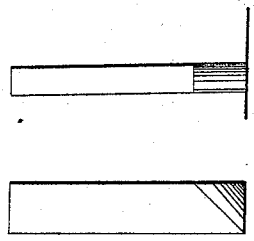
Fig. 4. Fig. 5.
Fig. 6.
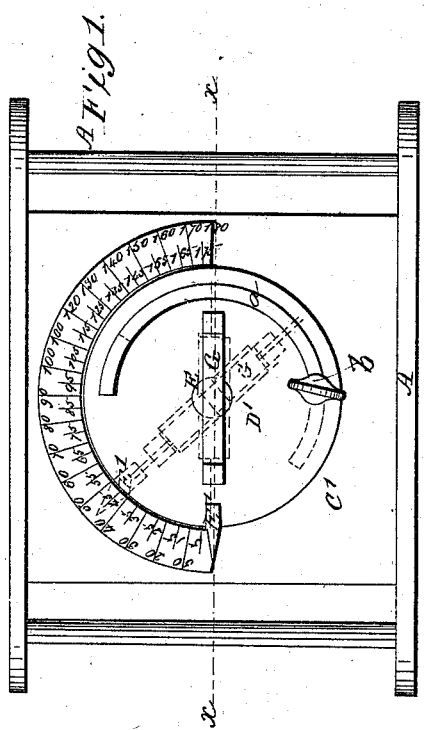
Fig. 1.
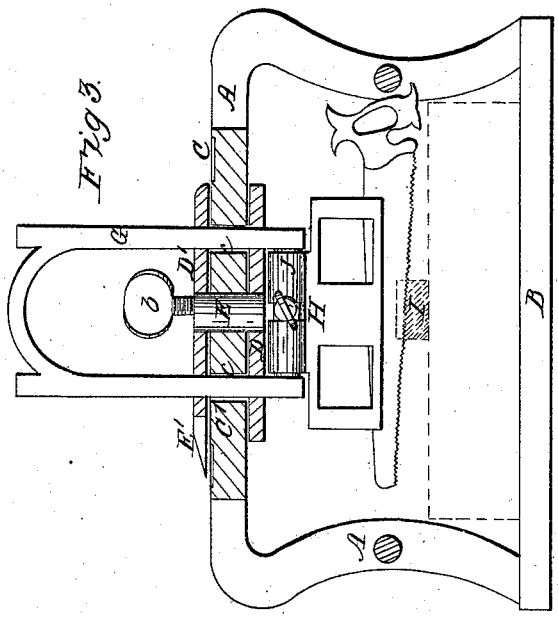
Fig. 3.

UNITED STATES PATENT OFFICE.

LORTON HOLLIDAY, OF ROGERSVILLE, NEW YORK.

MITER AND BEVELING MACHINE.

Specification of Letters Patent No. 12,862, dated May 15, 1855.

*To all whom it may concern:*

Be it known that I, LORTON HOLLIDAY, of Rogersville, in the county of Steuben and State of New York, have invented a new and useful Improvement in Metallic Miter-Boxes and Beveling-Machines; and I do hereby declare that the following is a full, clear, and exact description of the same, reference being had to the accompanying drawings, forming part of this specification, in which—

Figure 1, is a plan or top view of a miter box and beveling machine, constructed after my plan. Fig. 2, is an end view of the same. Fig. 3, is a vertical longitudinal section through the red line $x$, $x$, in Fig. 1. Figs. 4, 5, and 6 show a board or strip with a miter, and a bevel lap formed on it.

Similar letters of reference in each of the several figures indicate corresponding parts.

This improvement relates to miter boxes, and renders the saw guide capable of being changed with ease and facility from one angle to another, and so adjusted when desirable as to cause the saw which cuts the miter to form a bevel lap on the board or strip, simultaneous with the sawing of the miter.

To enable others skilled in the art to make and use my invention, I will proceed to describe its construction and operation.

A, represents a frame for supporting the operative mechanism as shown. This frame is provided with a stop or side rail B, for steadying the timber or the block upon which it rests while the sawing of a miter, or miter and bevel lap, is being performed. It also has an index or scale C, arranged on it as shown in Fig. 1.

D, $D^1$, are two circular disks secured fast on a revolving axis E, which passes down through the center of the top $C^1$. One of said disks being arranged under the top $C^1$, and the other above it as represented. The disk $D^1$, carries a pointer $E^1$, for designating on the scale, the angle to which the saw guide F, is adjusted—this disk is also provided with a semicircular slot $a$, and a set screw $b$, said slot allowing it to turn when the set screw is loose, and the set screw serving to hold it firmly after the desired adjustment of the saw guide F, has been made.

G, is a movable frame passing up through the disks D, $D^1$, and turning with them, in a circular slot $c$, cut in the top $C^1$, of the frame, as shown in Fig. 2. To the lower end of this frame, the saw guide is attached by a hinge J, so as to swing or turn freely when it is desired to adjust it and the saw to the position shown in dotted red lines in Fig. 2; it occupying this position when it is desired to have the saw form a bevel lap on the strip at the same time that the miter is cut. The saw guide is shaped as shown in Figs. 2 and 3, and the saw is placed in it, as illustrated in Fig. 3.

H, is a set screw for locking or securing the saw guide in the position shown in red dotted lines in Fig. 2 or in any other position which it may occupy, while the sawing of the miter, or miter and bevel lap is being performed. The frame G, which carries the saw guide is made movable up and down, so that the saw may be adjusted to suit the thickness of the strip being mitered, or mitered and beveled.

I, shown in red, is a strip being operated upon by the saw.

In Figs. 1, 2, and 3, the disks, movable frame and saw guide are represented by black lines, as in position for sawing at right angles, to the length of the strip I, and in red lines in the position they occupy when sawing an angle of 45°, as indicated by the pointer, shown in red on the scale. In Fig. 2, the saw guide is shown by dotted red lines turned in the path of a vertical circle to an oblique position, and by full red lines in the path of a horizontal circle to an angle of 45°. It being thus adjusted when it is desired to form a miter and bevel lap on the strip, at one operation.

What I claim as my invention, and desire to secure by Letters Patent, is—

The manner herein specified and shown, of arranging and combining the several parts constituting the miter box herein described, this arrangement and combination rendering the saw guide capable of being adjusted in the path of a horizontal circle, as well as in the path of a vertical circle, to any angle desired, and enables the saw to cut a bevel lap on the strip or board, simultaneous with the sawing of the miter or angle, and also indicates the angle cut, substantially as set forth.

LORTON HOLLIDAY.

Witnesses:
ORSON MOSHER,
IRA W. CHASE.